(12) United States Patent
Zhang et al.

(10) Patent No.: US 10,356,642 B2
(45) Date of Patent: Jul. 16, 2019

(54) ENHANCED RRM MEASUREMENT MECHANISM IN MILLIMETER WAVE SYSTEM

(71) Applicant: MEDIATEK (Beijing) INC., Beijing (CN)

(72) Inventors: Yuanyuan Zhang, Beijing (CN); Aimin Justin Sang, San Diego, CA (US)

(73) Assignee: MEDIATEK (Beijing) INC., Beijing (CN)

( * ) Notice: Subject to any disclaimer, the term of this patent is extended or adjusted under 35 U.S.C. 154(b) by 170 days.

(21) Appl. No.: 15/301,406

(22) PCT Filed: Mar. 4, 2016

(86) PCT No.: PCT/CN2016/075617
§ 371 (c)(1),
(2) Date: Oct. 3, 2016

(87) PCT Pub. No.: WO2016/138873
PCT Pub. Date: Sep. 9, 2016

(65) Prior Publication Data
US 2017/0034730 A1   Feb. 2, 2017

(30) Foreign Application Priority Data
Mar. 5, 2015   (WO) ................ PCT/CN2015/073679

(51) Int. Cl.
*H04W 16/28* (2009.01)
*H04W 24/10* (2009.01)
(Continued)

(52) U.S. Cl.
CPC ............. *H04W 24/10* (2013.01); *H04L 43/16* (2013.01); *H04W 24/08* (2013.01);
(Continued)

(58) Field of Classification Search
CPC ... H04W 72/046; H04W 24/10; H04W 16/28; H04W 72/08; H04W 88/06; H04W 88/10;
(Continued)

(56) References Cited

U.S. PATENT DOCUMENTS 6,061,562 A   5/2000   Martin
2005/0176385 A1   8/2005   Stern-Berkowitz
(Continued)

FOREIGN PATENT DOCUMENTS

CN   103891161 A   6/2014
CN   104115419 A   10/2014
(Continued)

OTHER PUBLICATIONS

Jian A.Zhang et al. Massive Hybrid Antenna Array for Millimeter-wave Cellular Communications IEEE Wireless Communication Feb. 28, 2015(Feb. 28, 2015) No. 1 vol. 22.
(Continued)

*Primary Examiner* — Jung Liu
(74) *Attorney, Agent, or Firm* — Winston Hsu (57) ABSTRACT

Methods and apparatus are provided for enhanced mechanism for RRM measurement in the mmW system. In one novel aspect, the filtered-consolidation measurement result is generated for each cell. The UE measures multiple control beams in an mmW system. The UE either performs a layer-3 filtering on each of the measured control beams or on consolidation measurement results for each control beam of the cell. The UE generates the filtered-consolidation measurement results for each corresponding cell. In another novel aspect, an intra-cell threshold and an inter-cell threshold are configured, wherein the intra-cell threshold is greater than the inter-cell threshold. The UE obtains a consolidation measurement for the serving cell and compares the result with the two preconfigured thresholds. The UE performs
(Continued)

different level of control beam measurements based on the comparison of the consolidation measurement of the serving and the two thresholds.

16 Claims, 7 Drawing Sheets

(51) Int. Cl.
    *H04W 24/08*    (2009.01)
    *H04W 36/30*    (2009.01)
    *H04W 36/00*    (2009.01)
    *H04L 12/26*    (2006.01)
    *H04W 48/20*    (2009.01)
    *H04W 36/08*    (2009.01)

(52) U.S. Cl.
    CPC ....... *H04W 36/0083* (2013.01); *H04W 36/30* (2013.01); *H04W 36/0061* (2013.01); *H04W 36/08* (2013.01); *H04W 48/20* (2013.01)

(58) Field of Classification Search
    CPC ... H04W 48/20; H04B 7/0617; H04B 7/0695; H04B 7/063; H04B 7/0634; H04L 12/2405; H04L 41/0226
    See application file for complete search history.

(56) References Cited

U.S. PATENT DOCUMENTS

| | | |
|---|---|---|
| 2005/0176468 A1 | 8/2005 | Iacono |
| 2005/0176469 A1 | 8/2005 | Stern-Berkowitz |
| 2005/0239464 A1 | 10/2005 | Iacono |
| 2007/0217688 A1 | 9/2007 | Sabe |
| 2013/0121185 A1* | 5/2013 | Li ...................... H04W 72/046 370/252 |
| 2014/0269368 A1* | 9/2014 | Xu ....................... H04W 24/00 370/252 |
| 2015/0222345 A1 | 8/2015 | Chapman |
| 2015/0230263 A1* | 8/2015 | Roy .................. H04W 36/0083 455/452.2 |
| 2016/0135148 A1* | 5/2016 | Novlan ..................... H04L 1/00 370/329 |
| 2016/0262077 A1 | 9/2016 | Zhang |
| 2017/0006539 A1* | 1/2017 | Kakishima .......... H04B 7/0478 |
| 2017/0142621 A1* | 5/2017 | Lu ...................... H04W 36/0094 |
| 2017/0171761 A1* | 6/2017 | Guvenc .................. H04W 4/90 |
| 2017/0195027 A1* | 7/2017 | Baek ................... H04B 7/0617 |
| 2017/0214444 A1* | 7/2017 | Nigam .................. H04B 7/063 |
| 2017/0273097 A1* | 9/2017 | Guo ..................... H04W 72/121 |

FOREIGN PATENT DOCUMENTS

| | | |
|---|---|---|
| KR | 1020160015821 A | 2/2016 |
| WO | 2014027824 A1 | 2/2014 |
| WO | 2014172306 A2 | 10/2014 |

OTHER PUBLICATIONS

Mohmmad Anas et al. Performance Analysis of Handover Measurements and Layer 3 Filtering for UTRAN LTE 2007 IEEE 18th International Symposium on Personal, Indoor and Mobile Radio Communications.

"International Search Report" dated Jun. 7, 2016 for International application No. PCT/CN2016/075617, International filed:Mar. 4, 2016.

"International Search Report" dated Dec. 16, 2015 for International application No. PCT/CN2015/073679, International filed:Mar. 5, 2015.

Theodore S. Rappaport et al., Broadband Millimeter-Wave Propagation Measurements and Models Using Adaptive-Beam Antennas for Outdoor Urban Cellular Communications, IEEE Transactions on Antennas and Propagation, Apr. 30, 2013, vol. 61, No. 4, p. 1850-1859.

* cited by examiner

| METHOD | CELL 0 (CANDIDATE CB) | CELL 1 (CANDIDATE CB) | CELL 2 (CANDIDATE CB) | CELL 3 (CANDIDATE CB) |
|---|---|---|---|---|
| METHOD 1 | 3 | 2 | 1 | 3 |
| METHOD 2 | $B_{S\_8}$ | $B_{N\_2}$ | $B_{N\_8}$ | $B_{N\_2}$ |
| METHOD 3 | $B_{S\_6}$ | $B_{N\_1}$ | $B_{N\_8}$ | $B_{N\_3}$ |
| METHOD 4 | $AVG(B_{S\_8}, B_{S\_7}, B_{S\_6})$ | $AVG(B_{N\_2}, B_{N\_1})$ | $AVG(B_{N\_8})$ | $AVG(B_{N\_2}, B_{N\_1}, B_{N\_3})$ |
| METHOD 5 | $VAR(B_{S\_8}, B_{S\_7}, B_{S\_6})$ | $VAR(B_{N\_2}, B_{N\_1})$ | $VAR(B_{N\_8})$ | $VAR(B_{N\_2}, B_{N\_1}, B_{N\_3})$ |
| METHOD 6 | $SUM(B_{S\_8}, B_{S\_7}, B_{S\_6})$ | $SUM(B_{N\_2}, B_{N\_1})$ | $SUM(B_{N\_8})$ | $SUM(B_{N\_2}, B_{N\_1}, B_{N\_3})$ |

ENHANCED RRM MEASUREMENT MECHANISM IN MILLIMETER WAVE SYSTEM

CROSS REFERENCE TO RELATED APPLICATIONS

This application claims PCT application serial number PCT/CN2015/073679, entitled "METHODS AND APPARATUS FOR CELL SELECTION/RESELECTION IN MILLIMETER WAVE SYSTEM" filed on Mar. 5, 2015, the subject matter of which is incorporated herein by reference.

TECHNICAL FIELD

The disclosed embodiments relate generally to wireless communication, and, more particularly, to an enhanced radio resource management (RRM) mechanism in millimeter wave (mmW) system.

BACKGROUND

The bandwidth shortage increasingly experienced by mobile carriers has motivated the exploration of the underutilized millimeter wave (mmW) frequency spectrum between 6 G and 300 G Hz for the next generation broadband cellular communication networks. The available spectrum of mmW band is two hundred times greater than the conventional cellular system. The mmW wireless network uses directional communications with narrow beams and can support multi-gigabit data rate. The underutilized bandwidth of the mmW spectrum has wavelengths ranging from 1 mm to 100 mm. The very small wavelengths of the mmW spectrum enable a large number of miniaturized antennas to be placed in a small area. Such miniaturized antenna system can produce high beamforming gains through electrically steerable arrays generating directional transmissions.

With recent advances in mmW semiconductor circuitry, mmW wireless system has become a promising solution for the real implementation. However, the heavy reliance on directional transmissions presents particular challenges for the mobile stations in the mmW network. Unlike the traditional cellular system, the mmW cell is covered by one or more than one directional beams. Therefore, the synchronization and broadcast signals for a cell are also directional and only cover a small area. The mobile stations need to scan over a range of angles before a cell can be detected. The traditional RRM measurement procedure is not applicable for mmW system.

Improvements and enhancements are required to enhance radio resource management (RRM) mechanism in the millimeter wave (mmW) system.

SUMMARY

Methods and apparatus are provided for enhanced mechanism for RRM measurement in the mmW system. In one novel aspect, the filtered-consolidation measurement result is generated for each cell. In one embodiment, the UE measures multiple control beams in the mmW system. The UE performs layer-3 filtering on each of the measured control beams. The filtered measurement results are then consolidated to generate the filtered-consolidation measurement results. In another embodiment, the UE measures multiple control beams in the mmW system and consolidates one or more control beams for each cell according to a consolidation rule. The consolidated results for each cell pass the layer-3 filtering to generate the filtered-consolidation measurement results.

In one novel aspect, a two-level measurement threshold mechanism is used to perform the RRM measurement. In one embodiment, an intra-cell threshold and an inter-cell threshold are configured, wherein the intra-cell threshold is greater than the inter-cell threshold. The UE obtains a consolidation measurement result for the serving cell and compares the result with the two preconfigured threshold. In one embodiment, the consolidation measurement result of the serving cell is a filtered-consolidation result for the serving cell. In one embodiment, the UE performs measurements on the serving beams of the serving cell only if the consolidation measurement of the serving cell is greater than the intra-cell threshold. Otherwise, if the consolidation measurement on the serving beams of the serving cell is greater than the inter-cell threshold but less than or equal to the intra-cell threshold, the UE performs the measurement on the control beams of the serving cells only without performing measurements for the neighboring cells. Otherwise, the UE performs measurements on the control beams of the serving cell and the neighboring cells.

In one embodiment, the UE evaluates whether the report triggering criteria is met. The UE initiates the measurement report procedure upon determining that one or more report triggering are met. In another embodiment, the UE selects a report type. The measurement report may include per-beam measurement result together with the corresponding beam ID, the per-beam measurement results in a pre-defined order, the consolidation measurement results, or a hybrid report includes a per-beam measurement report and a consolidation measurement report.

BRIEF DESCRIPTION OF DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In the mmW system, each cell is partitioned into different areas with each covered by one control beam. The measurement performing, measurement reporting, and measurement report triggering are based on measurement results of the set of control beams associates with different cells. Furthermore, for the mmW system, additional operation of beam switching is required. When the UE communicates with the mmW base station, the UE needs to select one or more than one control beam to acquire system information and monitoring paging messages, also to perform RRM and mobility measurement. The beam switching is used for the UE to acquire better beams for reliable data transportation, including the data transmission and the data reception. Several issues are unique to the mmW system such as how to consolidate the measurement results and generate the measurement report for each cell for the purpose of mobility and RRM measurement.

Figure 1:
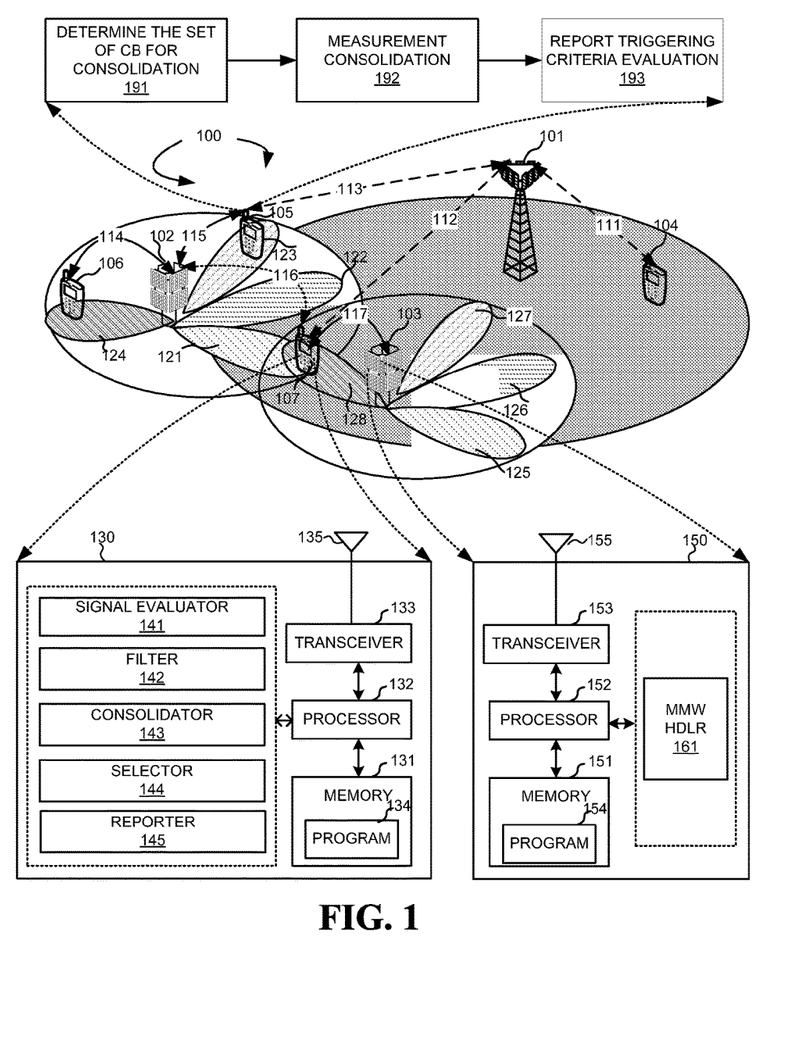
FIG. 1 is a schematic system diagram illustrating an exemplary wireless network with mmW connections in accordance with embodiments of the current invention.

Although the embodiments of current invention are described according to the MMW system, the person skilled in the art could learn that, in the cellular system where the UE could use the beam in the cell, the described features could be used. The mobile system includes not only the MMW system working on high frequency spectrum but also the system working on low frequency spectrum, and the scope of current invention is not limited by the specific MMW system. FIG. 1 is a schematic system diagram illustrating an exemplary wireless network 100 with mmW connections in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve a number of mobile stations 104, 105, 106 and 107 within a serving area, for example, a cell, or within a cell sector. In some systems, one or more base stations are communicably coupled to a controller forming an access network that is communicably coupled to one or more core networks. eNB 101 is a conventional base station served as a macro eNB. eNB 102 and eNB 103 are mmW base stations, whose serving area partially or wholly overlap with the serving area of eNB 101, or does not overlap, as well as at least partially overlap with each other at the edge. mmW eNB 102 and mmW eNB 103 has multiple sectors each with multiple control beams to cover a directional area, wherein each control beam further comprises multiple dedicated beams in hierarchy. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with mmW network only, which is covered by control beam 124 of eNB 102 and is connected with eNB 102 via a link 114. UE 105 is the overlapping service area of eNB 101 and eNB 102. In one embodiment, UE 105 is configured with dual connectivities and can be connected with eNB 101 via a link 113 and eNB 102 via a link 115. UE 107 is in the service areas of eNB 101, eNB 102 and eNB 103. During the RRM procedure in the mmW system, UE 107 measures multiple cells covered by eNB 101, eNB 102 and eNB 103. Each of mmW cells has one or more control beams. UE 107 measures the detected beams, or serving beams or all the beam satisfying certain criteria, e.g. receiving power is above a threshold, and calculates a filtered-consolidation measurement for each cell. In one embodiment, the filter-consolidation measurement result is obtained by performing the layer-3 filtering for each selected control beam followed by the consolidation process. In another embodiment, the filter-consolidation measurement result is obtained by consolidating each selected control beam followed by the layer-3 filtering process.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signals, and sends them to processor 132. RF transceiver module 133 is an example, and in one embodiment, the RF transceiver module comprises two RF modules (not shown), first RF module is used for mmW transmitting and receiving, and another RF module is used for different frequency bands transmitting and receiving, which is different from the mmW transmitting and receiving. RF transceiver 133 also converts received baseband signals from processor 132, converts them to RF signals, and sends out to antenna 135. Processor 132 processes the received baseband signals and invokes different functional modules to perform features in UE 107. Memory 131 stores program instructions and data 134 to control the operations of UE 107. UE 107 also includes multiple function modules that carry out different tasks in accordance with embodiments of the current invention. A signal evaluator 141 measures multiple control beams/serving beams in the mmW system, wherein the mmW system has multiple cells each configured with multiple control beams/serving beams. A filter 142 performs a layer 3 filtering on one or more sets of measurement results received from physical layer and generates one or more filtered signal measurements for each corresponding cell. A consolidator 143 generates a filtered-consolidation measurement result for one or more cell based on the one or more filtered signal measurements associated with each corresponding cell using a consolidation rule. A selector 144 compares the filtered-consolidation measurement result of the serving cell with an intra-cell threshold and an inter-cell threshold, wherein the intra-cell threshold is greater than the inter-cell threshold, and performs measurements on the serving beams of the serving cell only if the filtered-consolidation measurement result of the serving cell measurement is greater than the inter-cell threshold, and performs measurements of the control beams of the serving cell only if the filtered-consolidation measurement result of the serving cell measurement is greater than the inter-cell threshold and less than or equal to the intra-cell threshold. Otherwise, UE performs measurement on the control beams of the serving cell and the neighbor cells. A reporter 145 sends a measurement report if one or more measurement reporting criteria are met.

Similarly, eNB 103 has an antenna 155, which transmits and receives radio signals. A RF transceiver module 153, coupled with the antenna, receives RF signals from antenna 155, converts them to baseband signals, and sends them to processor 152. RF transceiver module 153 is an example, and in one embodiment, the RF transceiver module comprises two RF modules (not shown), first RF module is used for mmW transmitting and receiving, and another RF module is used for different frequency bands transmitting and receiving which is different from the module used for mmW. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. An mmW handler 161 handles mmW functions for eNB 103.

FIG. 1 further shows functional procedures that handle RRM measurement procedures in the mmW system. UE 105 has a consolidation measurement procedure 191 that determines a set of control beams for consolidation for the UE. In one embodiment, the set of control beams for consolidation is the detected control beams for each cell. In another embodiment, the set of the control beams for consolidation are layer-3 filtered signal measurement for each control beam. UE 105 also has measurement consolidation procedure 192 that performs measurement consolidation for the UE. A reporting triggering criteria evaluation procedure 193 of UE 105 evaluates one or more detected conditions and criteria whether to send the measurement report.

Figure 2:
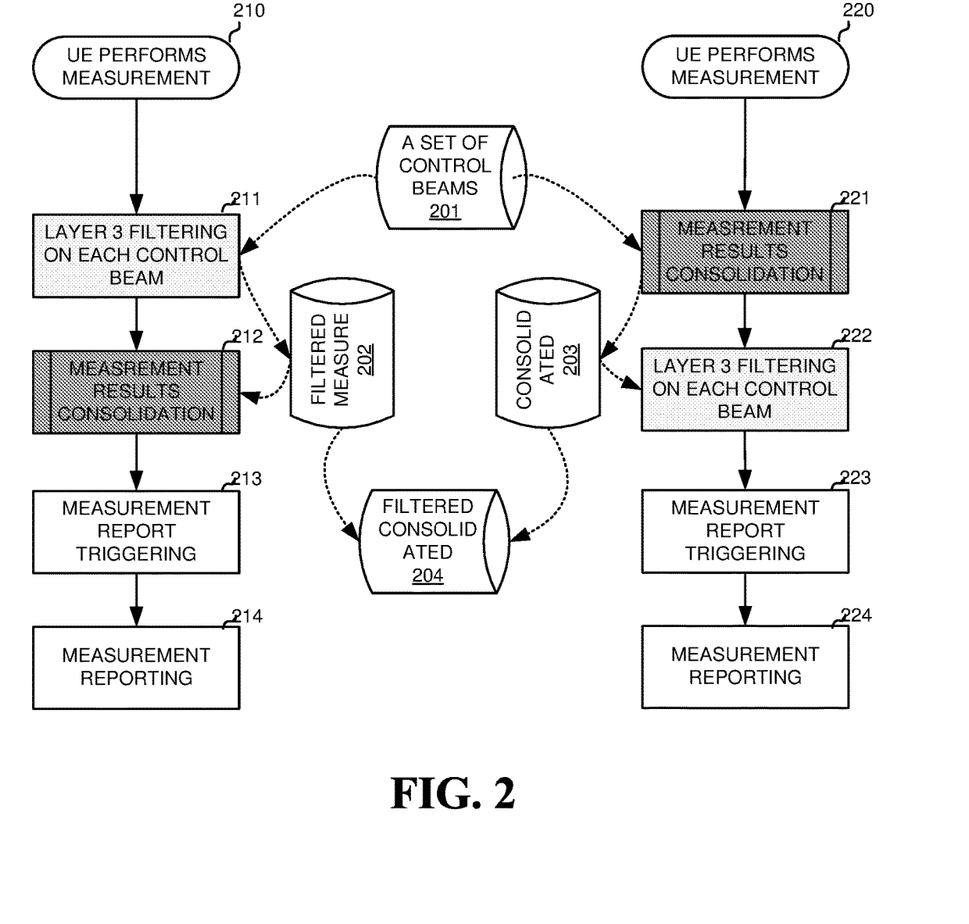
FIG. 2 shows exemplary flow charts of a UE generating filtered-consolidation reports for the network in accordance with embodiments of the current invention.

FIG. 2 shows exemplary flow charts of a UE generating filtered-consolidation reports for the network in accordance with embodiments of the current invention. In one novel aspect, a filtered-consolidation measurement report is generated for each corresponding cell in the mmW system. In one embodiment, the filtered-consolidation measurement report is generated by performing the layer-3 filtering first. At step 210, the UE performs measurement on a set of control beams 201. The set of control beams are selected based on preconfigured rules. At step 211, the UE performs layer-3 filtering on each control beam of the set of control beams 201. The layer-3 filtering generates the set of filtered measurement results 202. The filtered measurement results 202 are used at step 212. At step 212, the UE consolidates the filtered measurement results and generates the filtered-consolidation measurements 204. At step 213, the UE detects and evaluates one or more report triggering events. At step 214, upon determining the report sending criteria is met, the UE sends the measurement report.

In another embodiment, the filtered-consolidation measurement report is generated by consolidating the control beams for each corresponding cells first. At step 220, the UE performs measurement on a set of control beams 201. The set of control beams are selected based on preconfigured rules. At step 221, the UE performs measurement consolidation on each set control beams of the set of control beams 201. The consolidation procedure generates the set of consolidated measurement results 203. The consolidated measurement results 203 are used at step 222. At step 222, the UE performs layer-3 filtering on each consolidation results for each corresponding cell and generates the filtered-consolidation measurements 204. At step 223, the UE detects and evaluates one or more report triggering events. At step 224, upon determining the report triggering criteria is met, the UE initiates the measurement report procedure to report the measurement results.

Figure 3:
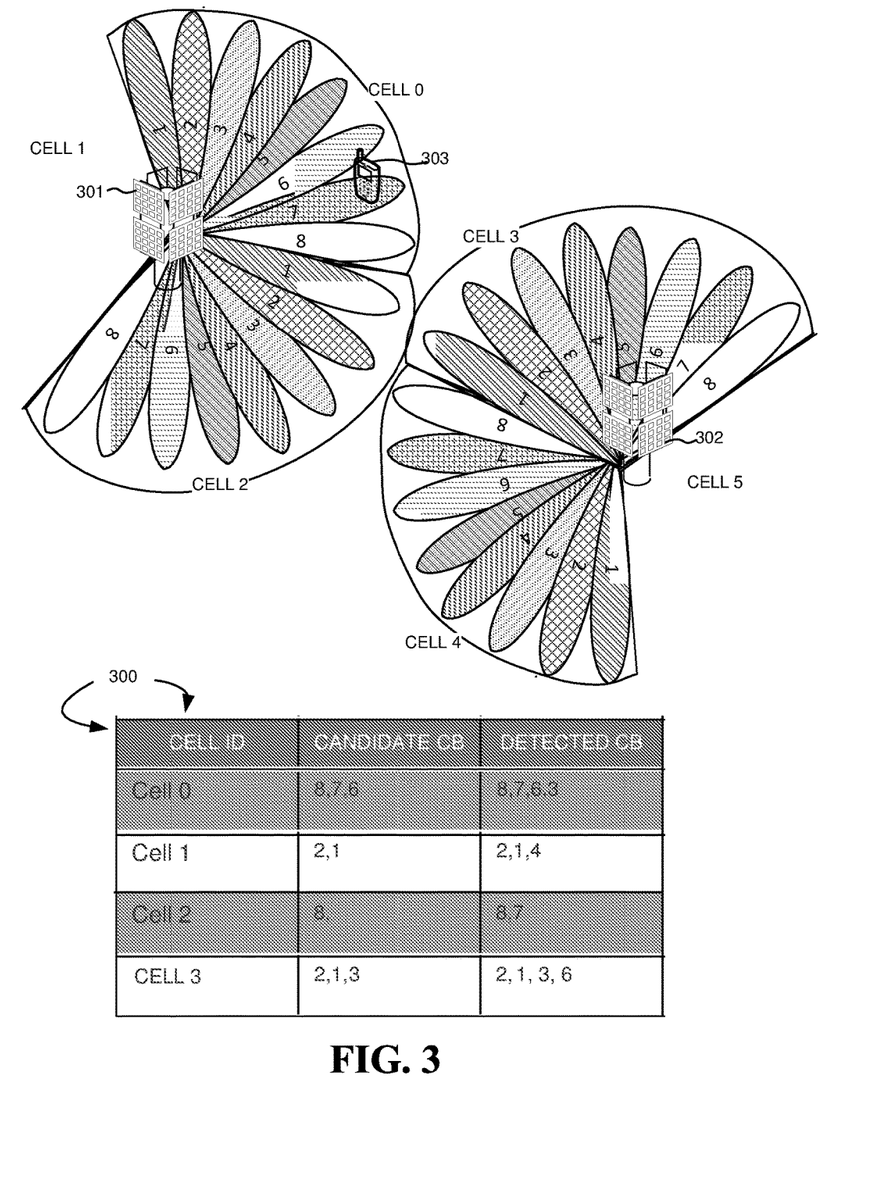
FIG. 3 illustrates an exemplary control beam configuration for UL and DL of the UE in accordance with the current invention.

In one embodiment, the UE selects a set of candidate control beams to perform the measurements. FIG. 3 shows exemplary diagrams and a table illustrating multiple control beam measurement of UE in a mmW network. A UE 303 locates in an area served by an mmW eNB 301 and mmW eNB 302. eNB 301 and eNB 302 are directionally configured with multiple sectors/cells. Each sector/cell is covered by a set of coarse TX control beams. In one example, three sectors/cells are configured, each covering a 120° sector. In one embodiment, each cell is covered by eight control beams. Different control beams are time division multiplexed (TDM) and distinguishable. Phased array antenna is used to provide moderate beamforming gain. The set of control beams is transmitted repeatedly and periodically. Each control beam broadcasts the cell-specific information such as synchronization signal, system information, and beam-specific information.

In the embodiments, there are some terms need to clarify:
Candidate control beam: One or more than one control beams in a cell which satisfy a pre-defined criterion, i.e. the signal strength, quality or life time, or any combination of above of the control beam exceeds the corresponding threshold. The criterion is specified to guarantee that the strength or quality of DL signal on the control beam is strong enough to be received by the UE.

Detected control beam: If the energy of a control beam can be detected, it is considered as the detected control beam.

Serving control beam: One or more than one control beams in the serving cell on which UE acquires system information, receives paging message, and perform data transportation.

As an example, eNB 301 covers three cells #0 and cell #1 and cell #2. Similarly, eNB 302 covers three cells #3 and cell #4 and cell #5. UE 303 detecting control beams for RRM and mobility measurement. As an example shown in FIG. 3, each cell is configured with eight control beams. UE 303 detects multiple control beams and performs signal measurements on the detected multiple control beams. Up detecting control beams, UE 303 may determine whether the detected control beam is a candidate control beam based on a candidate rule. In one embodiment, the detected control beam is a candidate control beam if the signal measurement is larger than a threshold. As an example, FIG. 3 illustrates a table 300 of detected control beams and candidate control beams for UE 303. A list of control beams is listed for each cell in a descending order of the signal measurement. UE 303 detects control beams (CBs) CB8, CB7, CB6 and CB3 in descending order from cell #0. UE 303 determines that CB8, CB7, and CB6 are candidate control beams from cell #0. Similarly, UE 303 detects control beams CB2, CB1 and CB4 in descending order from cell #1. UE 303 determines that CB2, and CB1 are candidate control beams from cell #1. For Cell #2, UE 303 detects control beams CB8 and CB7 and determines that CB8 is the candidate control beam. UE 303 detects control beams CB2, CB1, CB3 and CB6 in descending order from cell #3. UE 303 determines that CB2, CB1, and CB3 are candidate control beams from cell #3. Once the UE detects control beams and determines candidate control beams, the UE can calculate the consolidation measurement for each cell based on the one or more signal measurement obtained associated with the corresponding cell.

Figure 4:
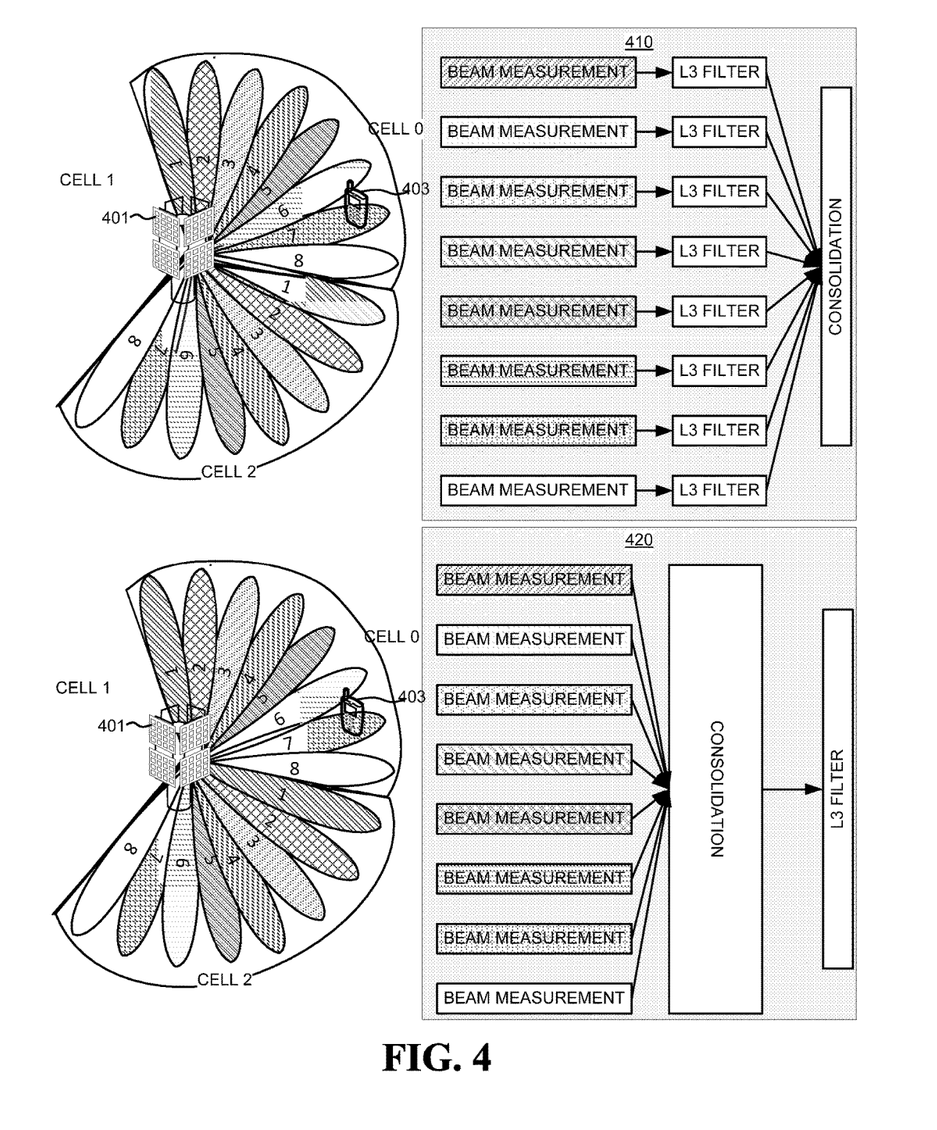
FIG. 4 shows exemplary diagrams of generating filtered-consolidation measurement results in the mmW system in accordance with embodiments of the current invention.

FIG. 4 shows exemplary diagrams of generating filtered-consolidation measurement results in the mmW system in accordance with embodiments of the current invention. eNB 401 covers three cells #0 and cell #1 and cell #2. UE 403 detecting control beams for each cell. As an example shown in FIG. 4, each cell is configured with eight control beams. UE 403 detects multiple control beams and performs signal measurements on the detected multiple control beams. In one embodiment, illustrated in procedure 410, UE 403 detects and measures eight control beams for cell #0. Each of the measured eight control beams passes through layer-3 filtering. Each of the filtered measurement results, subsequently, passes to the consolidation procedure to generates the filtered-consolidation measurement results. In another embodiment, illustrated in procedure 420, UE 403 detects and measures eight control beams for cell #0. The measured control beams are consolidated for cell #0. The consolidation measurement result for cell #0 passes through layer-3 filtering and generates the filtered-consolidation measurement results.

Figure 5:
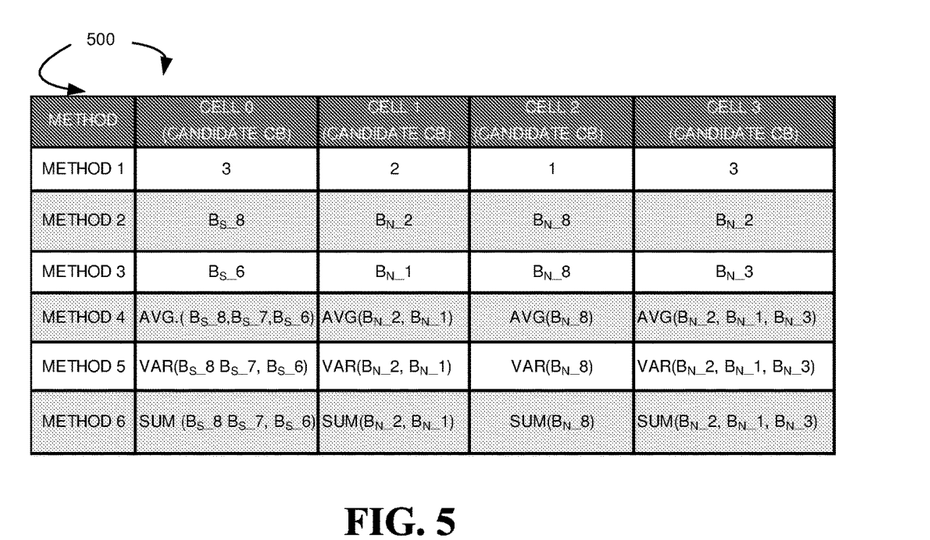
FIG. 5 illustrates an exemplary table that shows the consolidation measurement results based on different consolidation rules/methods in accordance with embodiments of the current invention.

The UE performs the consolidation either before or after the layer-3 filtering based on a consolidation rule. FIG. 5 illustrates an exemplary table that shows the consolidation measurement results based on different consolidation rules/methods in accordance with embodiments of the current invention. A table 500 lists the resulting consolidation measurement rules/methods assuming the detecting control beams shown in table 300 of FIG. 3. Table 500 assumes that candidate control beams are selected as qualified control beams for the consolidation measurement. Using method #1, Cell #0 has 3 CBs, Cell #1 has 2 CBs, Cell #2 has 1 CB, and Cell #3 has 3 CBs. Similarly, the UE can use different consolidation method as listed in table 500 to get a consolidation measurement for the corresponding cells. The resulting consolidation measurement for each cell can be the maximum signal measurement of the CB of the set (method #2), or the minimum signal measurement of the CB of the set (method #3), or the mean value of measurements of all candidate CBs of the set (method #4), or the variance of measurement of all candidate CBs of the set (method #5), or the sum of the measurements of all candidate CBs of the set (method #6).

In other embodiments, combinations of the above methods are used for the signal measurement of each cell. For example, the signal measurement results for each cell contains two measurements: a first weighted resulting consolidation measurement for each cell is the maximum signal measurement of the CB of the set (method #2) and a second weighted resulting consolidation measurement for each cell is the number of qualified control beams (method #1). The ranking of cells may be the same or may be different based on different measurements contained in the signal measurement. Providing a combination signal measurement for each cell presents a more complete picture of the cell condition such that the UE can select a better cell for RRM and mobility measurement. For example, using method #2, cell #2 may rank higher than cell #0 with a slightly higher maximum signal strength. However, using method #1, cell #0 may rank higher than cell #2 with a higher number of candidate control beams. In one embodiment, the UE uses an algorithm to select the target cell for RRM and mobility measurement. For example, a signal threshold is set such that the best-ranked cell using method #2 is selected if the maximum signal measurement is greater than the signal threshold; otherwise, the best-ranked cell using method #1 is selected. Similarly, a number threshold is set such that the best-ranked cell using method #1 is selected if the number of qualified control beams is greater than the number threshold; otherwise, the best-ranked cell using method #2 is selected. In other embodiments, a set of thresholds and/or a combination of thresholds are used for cell ranking. Multiple signal measurements can be combined with corresponding cell ranking algorithms.

Once the measurement reports are triggered, the UE initiates measurement report procedure to send the measurement report to the network upon one or more triggering criteria are met. In other embodiments, the measurement report is generated following a measurement report format.

Figure 6:
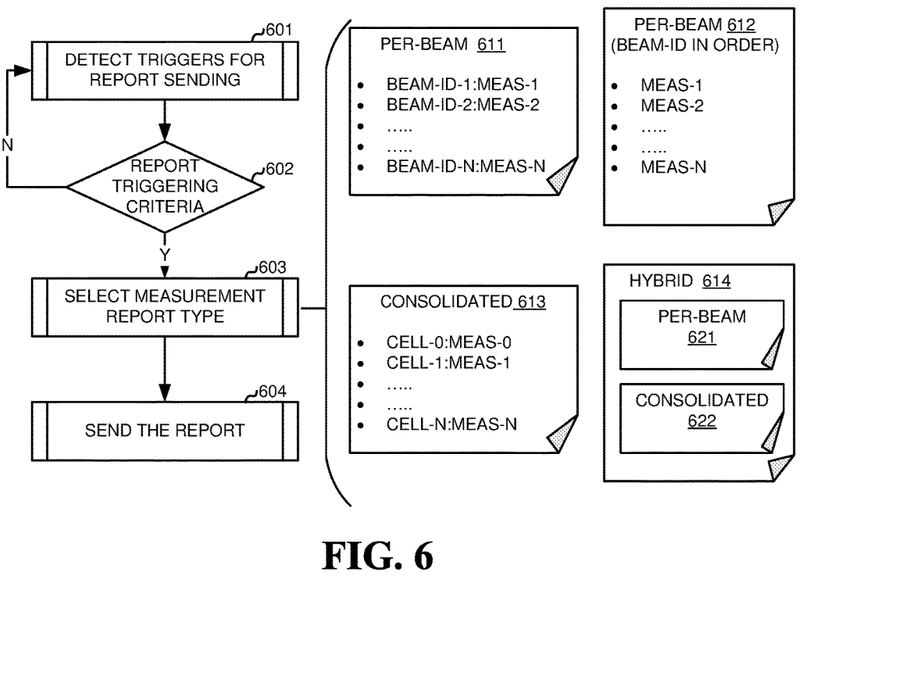
FIG. 6 illustrates exemplary diagrams for measurement report triggering and sending procedures in accordance with embodiments of the current invention.

FIG. 6 illustrates exemplary diagrams for measurement report triggering and sending procedures in accordance with embodiments of the current invention. At step 601, the UE detects triggers events for measurement report. In one embodiment, the triggering events include at least one of conditions of entering conditions and leaving conditions. At step 602, the UE determines whether the detected triggering event(s) meets the report triggering criteria. If step 602 determines no, the UE moves back to step 601 and continues monitoring the report triggering events. If step 602 determines yes, the UE moves to step 603. At step 603, the UE selects a measurement report type and generates the measurement report accordingly. In one embodiment, the measurement report type is preconfigured or predefined. The measurement report type can be configured through signaling with the network as well, for example, RRC signaling. At step 604, the UE sends the generated measurement report.

FIG. 6 also illustrates different types of measurement report options. In one embodiment, the measurement report 611 includes per-beam measurement data together with the corresponding beam ID. In another embodiment, the measurement report 612 includes per-beam measurement result in a pre-defined order. In one embodiment, the pre-defined order is the ascending order of the corresponding bream ID. In another embodiment, the pre-defined order is the descending order of the corresponding beam ID. In yet another embodiment, the measurement report 613 includes the consolidation measurement results. In one embodiment, the measurement report 614 is a hybrid report includes a per-beam measurement report 621 and a consolidation measurement report 622. In one embodiment, per-beam measurement report 621 includes beam ID. In another embodiment, per-beam measurement report 621 is generated with a pre-defined order.

In one embodiment, two-level thresholds are used to determine which measurement to perform based on the consolidation measurement results of the serving cell. A serving cell is the cell through which UE performs data transportation. There are one or more serving beams in the serving cell. The UE performs measurements on the serving beams of the serving cell and compares the consolidation results with predefine thresholds to determine what measurements to perform. An intra-cell threshold and an inter-cell threshold are configured, wherein the intra-cell threshold is greater than the inter-cell threshold. The UE obtains a consolidation measurement for the serving cell and compares the result with the two preconfigured threshold. In one embodiment, the consolidation measurement result of the serving cell is a filtered-consolidation result for the serving cell. In one embodiment, the UE performs measurements on the serving beams of the serving cell only if the consolidation measurement result of the serving cell is greater than the intra-cell threshold. If the consolidation measurement of the serving cell is greater than the inter-cell threshold and less than or equal to the intra-cell threshold, the UE performs the measurement on the control beams of the serving cells only without performing measurements for the neighboring cells. Otherwise, the UE performs measurements for the control beams on the control beams of the serving cell and the neighboring cells.

Figure 7:
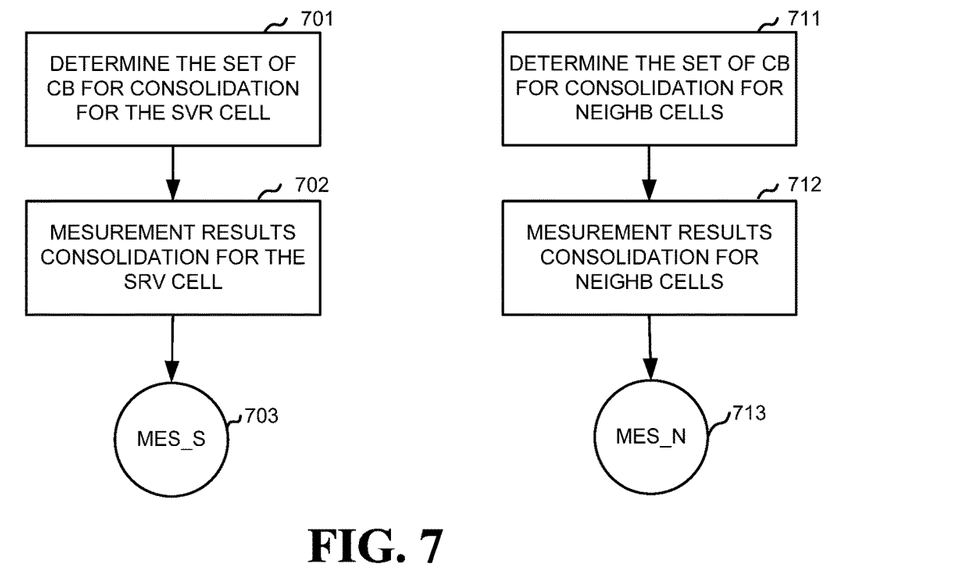
FIG. 7 illustrates exemplary flow charts of consolidation measurements performed for serving cells and neighbor cells in the mmW system in accordance with embodiments of the current invention.

FIG. 7 illustrates exemplary flow charts of consolidation measurements performed for serving cells and neighbor cells for the RRM measurement in the mmW system in accordance with embodiments of the current invention. At step 701, the UE determines a set of qualified control beams for consolidation measurement for the serving cell. For example, the set of qualified control beams may be the detected control beams in the serving cell, or the candidate control beams of the serving cell or the serving control beams of the serving cell. At step 702, the UE calculates the consolidation measurement for the serving cell based on the control beam selection at step 701. At step 703, the UE obtains the serving cell consolidation-measurement result MES_S. Similarly, the UE At step 711, the UE determines a set of qualified control beams for consolidation measurement for the neighboring cells. For example, the set of qualified control beams may be the detected control beams in the neighbor cells, or the candidate control beams of the neighboring cells. At step 712, the UE calculates the consolidation measurement for the neighboring cells based on the set of qualified control beams at step 711. At step 713, the UE obtains the neighboring cells consolidation-measurement result MES_N.

In the mmW system, the UE needs to monitor multiple beams in a cell to obtain the measurement result. The power consumption is a concern for frequent measurement. In one embodiment RRM mechanism for measurement, the UE determines the set of control beams to measure based on a comparison between the consolidation measurement result of the serving cell and a set of thresholds.

Figure 8:
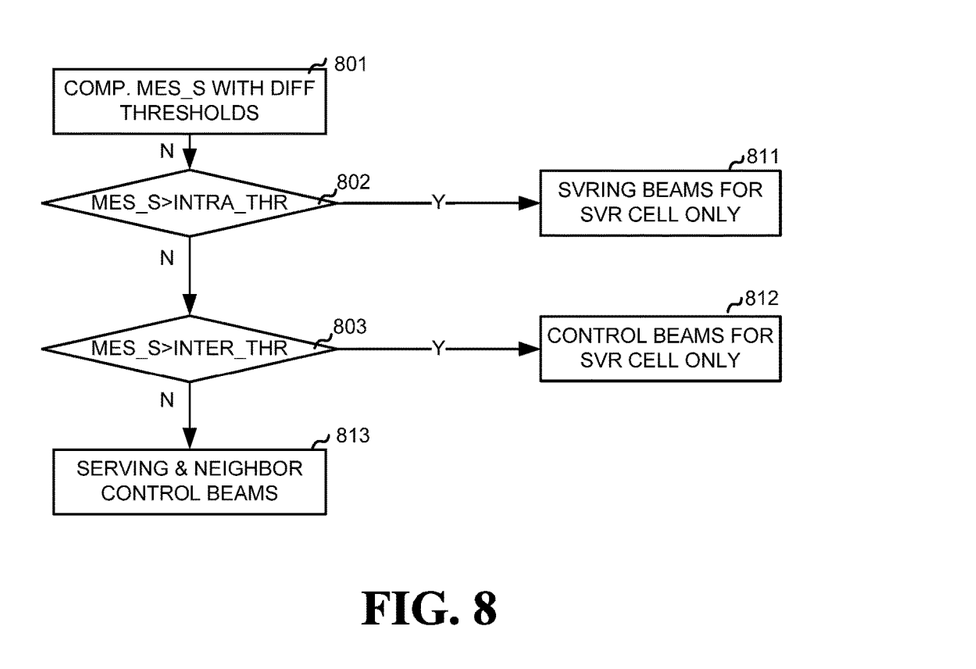
FIG. 8 shows an exemplary flow chart of the UE performing RRM measurement based on measurement rules according to a set of threshold in accordance with embodiments of the current invention.

FIG. 8 shows an exemplary flow chart of the UE performing RRM measurement based on measurement rules according to a set of threshold in accordance with embodiments of the current invention. In one embodiment, the UE is configured with a set of measurement thresholds, an intra-cell threshold, and an inter-cell threshold. The intra-cell threshold is greater than the inter-cell threshold. The intra-cell threshold can be broadcasted in the system information or beam-specific information. The inter-cell threshold can be broadcasted in the system information.

At step 801, the UE compares the serving cell consolidation measurement MES_S, as shown in FIG. 7, with a set of thresholds, wherein, the intra-cell threshold is greater than the inter-cell threshold. At step 802, the UE determines if MES_S is greater than the intra-cell threshold. If step 802 determines yes, the UE moves step 811 of a first measurement level. The UE only measures the serving control beams for the serving cell at step 811. If step 802 determines no, the UE moves step 803. At step 803, the UE determines if MES_S is greater than the inter-cell threshold and less than or equal to the intra-cell threshold. If step 802 determines yes, the UE moves step 812 of a second measurement level. The UE only measures the control beams in the serving cell but not for the neighboring cells at step 812. If step 803 determines no, the UE moves step 813. At step 813, the UE performs measurements for the control beams of the serving cell and the neighbor cells.

Figure 9:
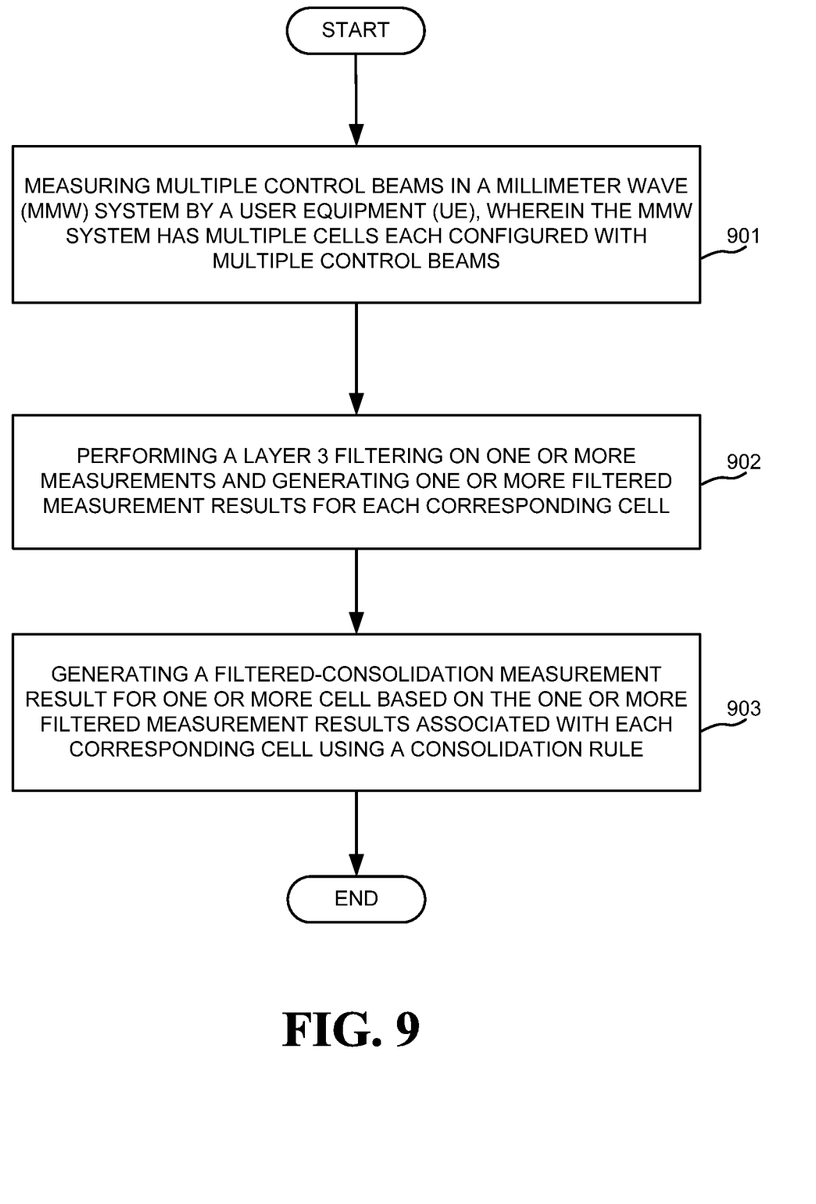
FIG. 9 is an exemplary flow chart for the enhanced RRM mechanism for measurement of the UE in the mmW system in accordance with embodiments of the current invention.

FIG. 9 is an exemplary flow chart for the enhanced RRM mechanism for measurement of the UE in the mmW system in accordance with embodiments of the current invention. At step 901, the UE measures multiple control beams in physical layer in a millimeter wave (mmW) system, wherein the mmW system has multiple cells each configured with multiple control beams. At step 902, the UE performs a layer-3 filtering on one or more measurement results and generating one or more filtered measurement results for each corresponding cell. At step 903, the UE generates a filtered-consolidation measurement result for one or more cell based on the one or more filtered measurement results associated with each corresponding cell using a consolidation rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
    measuring multiple control beams in a millimeter wave (mmW) system by a user equipment (UE), wherein the mmW system has multiple cells each configured with multiple control beams;
    performing a layer 3 filtering on one or more measurement results;
    generating one or more filtered measurement results for each corresponding cell; and
    generating a filtered-consolidation measurement result for one or more cell based on the one or more filtered measurement results associated with each corresponding cell using a consolidation rule, wherein the consolidation rule determines a consolidation measurement result for a set of qualified control beams based on a maximum signal measurement of the set,
    wherein the UE is camped on a serving cell and perform data transportation through one or more serving control beams associated with the serving cell, further comprising:
    comparing the filtered-consolidation measurement result of the serving cell with an inter-cell threshold; and
    performing measurements on the serving cell only if the filtered-consolidation measurement result of the serving cell is greater than the inter-cell threshold.

2. The method of claim 1, wherein the layer 3 filtering is performed on each control beam, and wherein generating the filtered-consolidation measurement result involve s consolidating each filtered measurement result for the corresponding cell.

3. The method of claim 1, wherein the layer 3 filtering is performed on each consolidation measurement result for each corresponding cell, wherein the consolidation measurement result of each cell is generated by consolidating each qualified control beams of the corresponding cell, and wherein the filtered-consolidation measurement result for each corresponding cell is an output of the layer 3 filtering of the cell.

4. The method of claim 1, further comprising:
    initiating a measurement report procedure to send the measurement report if a measurement report triggering criteria is met.

5. The method of claim 4, where the measurement report triggering criteria is checked based on the filtered-consolidation measurement, an entering condition, and a leaving condition.

6. The method of claim 4, wherein the measurement report includes the one or more filtered measurement results, each corresponding with a control beam.

7. The method of claim 6, wherein the measurement report includes the filtered-consolidation measurement result.

8. The method of claim 6, wherein the measurement result includes a hybrid report result of the filtered-consolidation measurement result and the one or more filtered measurement result, and each filtered measurement result corresponding with a control beam.

9. A user equipment (UE), comprising:
a radio frequency (RF) transceiver that transmits and receives radio signals in a millimeter wave (mmW) network;
a signal evaluator that measures multiple control beams in the mmW system, wherein the mmW system has multiple cells each configured with multiple control beams;
a filter that performs a layer 3 filtering on one or more measurement results and generates one or more filtered measurement results for each corresponding cell; and
a consolidator that generates a filtered-consolidation measurement result for one or more cell based on the one or more filtered measurement results associated with each corresponding cell using a consolidation rule, wherein the consolidation rule determines a consolidation measurement result for a set of qualified control beams based on a maximum signal measurement of the set,
wherein the UE is camped on a serving cell and perform data transportation through one or more serving control beams associated with the serving cell, and the user equipment further comprises:
a selector that compares the filtered-consolidation measurement result of the serving cell with an inter-cell threshold, and the user equipment performs measurements on the serving cell only if the filtered-consolidation measurement result of the serving cell is greater than the inter-cell threshold.

10. The UE of claim 9, wherein the layer 3 filtering is performed on each control beam, and wherein generating the filtered-consolidation measurement result involves consolidating each filtered measurement result for the corresponding cell.

11. The UE of claim 9, wherein the layer 3 filtering is performed on each consolidation measurements result for each corresponding cell, and wherein the consolidation measurement result of each cell is generated by consolidating each qualified control beams of the corresponding cell, and wherein the filtered-consolidation measurement result for each corresponding cell is an output of the layer 3 filtering of the cell.

12. The UE of claim 9, further comprising:
a reporter that initiates a measurement report procedure if at least one a measurement report triggering criteria are met.

13. The UE of claim 12, where the measurement report triggering criteria is checked based on the filtered-consolidation measurement, an entering condition, and a leaving condition.

14. The UE of claim 12, wherein the measurement report includes a set of per-beam measurement results, each corresponding with a control beam.

15. The UE of claim 14, wherein the measurement report includes the filtered-consolidation measurement result.

16. The UE of claim 14, wherein the measurement results include a hybrid result of the filtered-consolidation measurement result and the one or more filtered measurement result, and each filtered measurement result corresponding with a control beam.

* * * * *